Patented Oct. 15, 1929

1,731,433

UNITED STATES PATENT OFFICE

PAUL ONNERTZ, OF BERLIN-WILMERSDORF, AND HANS WESCHE AND KARL BRODERSEN, OF DESSAU, GERMANY, ASSIGNORS TO I. G. FARBENINDUSTRIE AKTIENGESELLSCHAFT, OF FRANKFORT-ON-THE-MAIN, GERMANY

NONDELIQUESCENT PRODUCT FROM SULPHITE WASTE LIQUOR

No Drawing. Original application filed April 16, 1925, Serial No. 23,692, and in Germany January 24, 1924. Divided and this application filed November 12, 1926. Serial No. 148,094.

Sulphite cellulose waste liquor finds many applications for example as an adhesive, for mordanting, tanning, protecting fibers and washing. For these purposes it is generally marketed in the form of concentrated solution of about 30–35° Beaumé specific gravity and of syrupy consistence. The reason for this form is that when the liquor is evaporated to dryness the preparation is strongly deliquescent and very quickly, and, particularly in a damp room, sets to a hard, dark resinous mass, the application of which is very difficult. The transport of the aqueous liquor is not economical and there are certain disadvantages connected with its use on account of its bulk.

The present invention relates to a nondeliquescent solid product easily soluble in water and having the valuable properties of the concentrated liquor and to a process for preparing such a product. The invention is based on the observation that the constituents which impart the deliquescent properties referred to can be made ineffectual in this respect by treating the liquor with an oxidizing agent, such as an alkali metal bichromate.

This application is a division of application Serial Number 23,692, filed Apr. 16, 1925.

The following examples, the parts being by weight, illustrate the invention without limiting it.

*Example 1*—100 parts of sulphite cellulose waste liquor of 28° Beaumé free from calcium- and iron-compounds are mixed with a solution of 5 parts potassium bichromate. The mass is evaporated and the dry residue powdered.

*Example 2*—To 100 parts of sulphite cellulose waste liquor of 36° Beaumé while stirring a solution of 4 parts of sodium nitrite and the equivalent quantity of hydrochloric acid are added. After several hours the mass is evaporated to dryness and then powdered.

What we claim is:

1. A non-deliquescent solid product soluble in water obtained from sulphite cellulose waste liquor by adding an alkali-metal bichromate to the liquor and then drying the solid constituents of the liquor so treated.

2. A non-deliquescent solid product soluble in water obtained from sulphite cellulose waste liquor free from calcium- and iron-compounds by adding an alkali-metal bichromate and then evaporating to dryness.

In testimony whereof we affix our signatures.

PAUL ONNERTZ.
HANS WESCHE.
KARL BRODERSEN.